US006050361A

United States Patent [19]

Ruffa et al.

[11] Patent Number: 6,050,361

[45] Date of Patent: Apr. 18, 2000

[54] CAVITATION-RESISTANT SONAR ARRAY

[75] Inventors: Anthony A. Ruffa, Hope Valley, R.I.; Thomas R. Stottlemyer, Mystic, Conn.

[73] Assignee: The United States of America as represented by the Secretary of the Navy, Washington, D.C.

[21] Appl. No.: 09/158,974

[22] Filed: Sep. 17, 1998

[51] Int. Cl.[7] .......................... G01V 1/00

[52] U.S. Cl. .......................... 181/108; 181/110

[58] Field of Search .......................... 181/110, 111, 181/112, 122, 104, 108; 367/122, 123, 153, 154, 155, 156

[56] References Cited

U.S. PATENT DOCUMENTS 4,271,490 6/1981 Minohara et al. .......................... 367/122

5,426,619 6/1995 Madden et al. .......................... 181/104

*Primary Examiner*—Khanh Dang

*Attorney, Agent, or Firm*—Michael J. McGowan; Prithvi C. Lall; Michael F. Oglo

[57] ABSTRACT

A cavitation-resistant sonar array having reduced spacing between transducer elements is provided. The array has a series of transducer elements attached to an array fixture with spacing between elements being fixed at one-quarter wavelength or closer. Cavitation caused by this close spacing is eliminated 11 by replacing the water spaces between elements with a rho-c rubber which matches the acoustic impedance, z, of water, that is z=ρc. The rho-c material is bonded to element to prevent loss of contact between the element and the spacer. A processing computation correcting signal data is provided to account for any differences in the speed of sound, c, in the rho-c material when compared to the speed of sound in water.

15 Claims, 3 Drawing Sheets

CAVITATION-RESISTANT SONAR ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention described herein relates to the field of sonar arrays and more particularly to the mounting of elements to reduce or prevent cavitation.

(2) Description of the Prior Art

The interaction between adjacent transducers can produce cavitation due to acoustic effects alone. Low-frequency Class IV flextensional transducers are often placed in arrays in very close proximity. In some cases, adjacent surfaces are within a few inches of each other. Ideally, such transducers should be spaced one-half wavelength of the acoustic waves apart in order to minimize acoustic interactions between transducers. However, system constraints often make this impossible. For example, an array of such transducers is often towed in a VDS (variable depth sonar) type towed body. It is desirable to make such a body as small as possible for several other reasons. For example, handling problems (during development and retrieval) are minimized. Also, snap loads become a problem as the body gets larger in size. Finally, the drag force on the towed body is increased, which then requires more downward force (in the form of weight or negative lift) to maintain the array at the required depth. The result of the close transducer spacing is that cavitation can occur, which can distort the acoustic signal, reduce the signal strength, and cause damage to the face of the transducers. There is thus a need for a practiced solution to reduce cavitation within the constraints of the design for the towed sonar array.

SUMMARY OF THE INVENTION

Accordingly, it is an object of the present invention to provide a sonar array having reduced element spacings compared to the half-length of the emitted acoustic signal.

It is another object of the invention to provide a sonar array providing cavitation resistant structure.

Yet another object of the present invention is to provide a sonar array having rho-c rubber material separating transducer elements.

In accordance with these and other objects, the invention is a cavitation-resistant sonar array having specific acoustic impedance matching that of water between the adjacent surfaces of class IV flextensional transducers by bonding a rho-c type material between the transducers. Many transducers may be spaced very closely due to system size and drag constraints. A rho-c material is bonded to adjacent surfaces that are sufficiently close together so that cavitation may not occur, replacing the water that would normally be between the transducers. At low frequencies, the region between the transducers separated by water cavitates when the negative pressure approached one atmosphere. When the rho-c material is bonded between the transducers, a tension of 14.7 psi (1 atm negative pressure) merely results in a local expansion or stretching of the rho-c material. No equivalent cavitation can occur as readily. The tensile strength of rho-c rubber, for example, is 285 psi, which greatly exceeds the above tensile stresses. Additionally, the acoustic properties of rho-c rubber do not change significantly as it is pressurized to several atmospheres as a result of being towed in a variable depth sonar body.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
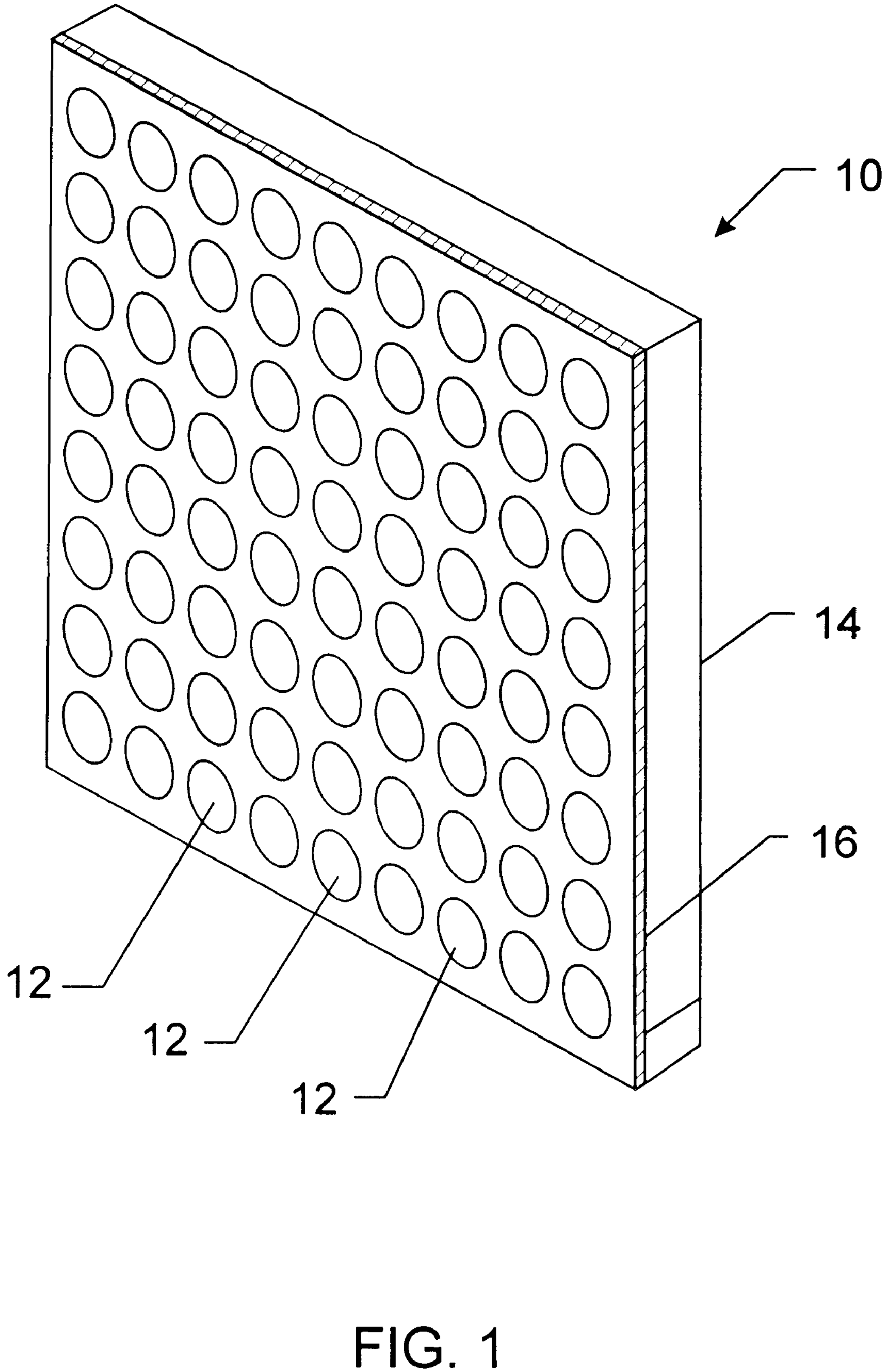
FIG. 1 is a perspective view of a representative planar array showing transducer elements embedded in a rho-c material.

Referring now to FIG. 1, the cavitation-resistant sonar array of the present invention, designated generally by the reference numeral 10 is depicted with its major components. Although the invention may be adapted to a variety of configurations including volumetric arrays, a typical planar array illustrates the arrangement of transducer elements 12 spaced along a transducer mount 14. A rho-c material, preferably rho-c rubber, is bonded to each transducer element 12, but is not bonded to the transducer mount 14. In the preferred embodiment, class IV flextensional transducers are attached to transducer mount 14.

Figure 2:
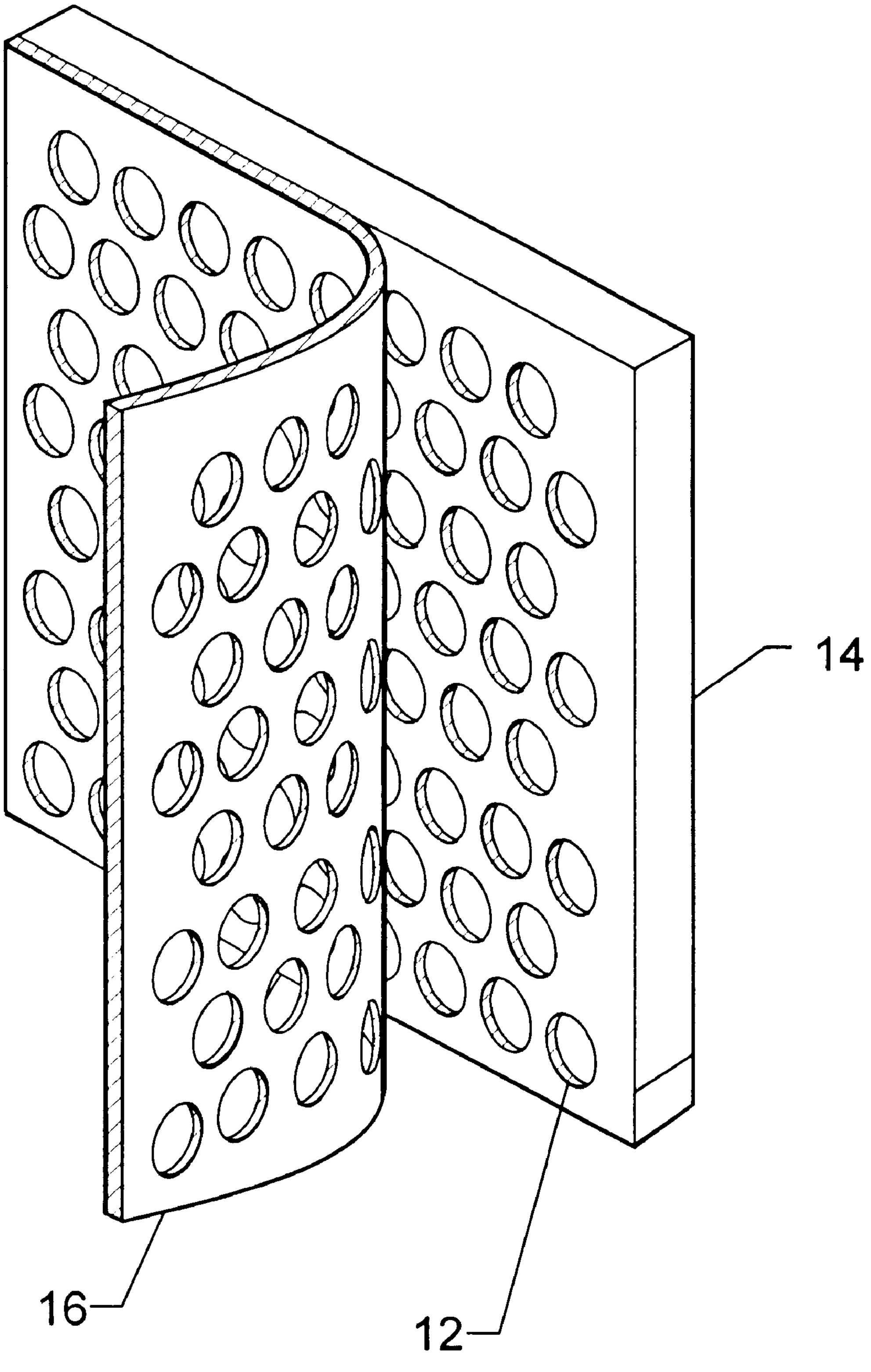
FIG. 2 is a perspective view of the array showing the rho-c material partially separated from the planar array.

As shown in FIG. 2, the rho-c material 16 is a flexible membrane having an acoustic impedance, z, matching that of seawater. The acoustic impedance z is the product of density, ρ, and the speed of sound, c, through the selected material ($z=\rho c$). The bonding of the rho-c material to the adjacent surfaces of the transducer elements 12, where the transducer elements 12 are closely spaced, prevents the cavitation which would occur with the transducer elements separated by seawater. Typically, spacing between transducer elements is one-half wavelength when separated by seawater. With the addition of rho-c material, spacing of onequarter wavelength or closer is possible. At low frequencies, for example, without the rho-c material, the region between transducer elements 12 will cavitate when the negative pressures approaches one atmosphere. However, when the rho-c material 16 is bonded between the transducer elements 12, a tension of 14.7 psi (1 atm. negative pressure) merely results in a local expansion or stretching of the rho-c material 16. No equivalent cavitation can occur as readily. The tensile strength of the rho-c rubber, for example, is approximately 285 psi equivalent, greatly exceeding the tensile stresses developed between the transducer elements 12. Additionally, the acoustic properties of the rho-c material do not change significantly as the array 10 descends to deeper water depths. The acoustic impedance of the rho-c material is relatively constant through a pressure change of several atmospheres, thereby providing constant impedance over the operating depth range of a typical variable-depth sonar (VDS) body.

Figure 3:
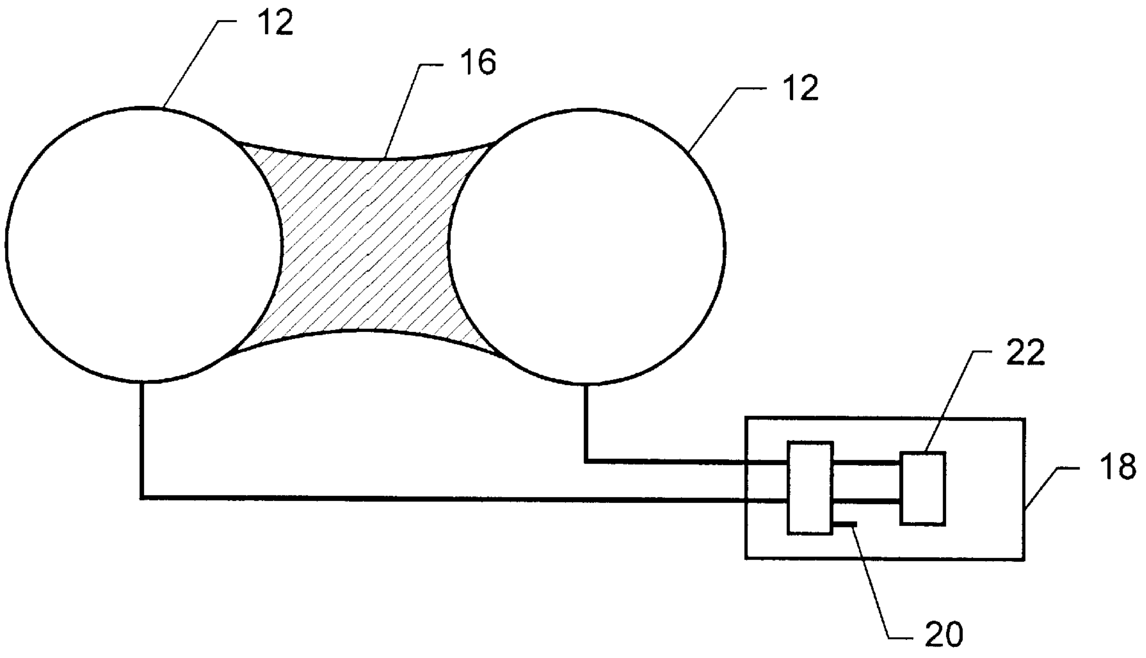
FIG. 3 is a depiction of two transducer elements with a rho-c separating material.

Referring now to FIG. 3, two representative transducer elements 12 are shown with a bonded rho-c material 16 located between the adjacent edges of the transducer elements 12. As previously noted, the rho-c material must match the acoustic impedance, z, of seawater, that is, the product of ρc must be the same in the material and in seawater. This matching impedance has the advantage of eliminating reflections at the rho-c material/water interface. However, many materials do not match both the rho and c values of seawater. As a result, computation of phasing and time delays at various beam steering angles must account for any differences in the speed of sound in the rho-c material as compared to that speed in seawater. These differences must be modeled in order to obtain a desired beam pattern. The modeling can be accomplished by an additional processing unit 18, which is connected to elements within the array. In the preferred embodiment, a look-up table 20 is incorporated into the processing unit 18 using an acoustic finite element model. In the alternative, the look-up table 20 may use a boundary element model. It is also possible to incorporate the look-up table directly into the beamformer processor. (The look-up tables are not physical entities but are programmed into the processor unit. The representation of the look-up tables in FIG. 3 is illustrative only.)

Another consequence of bonding the rho-c material 16 between the transducer elements 12 is modal coupling between transducers. Modal coupling is eliminated by corrections applied through another look-up table 22. The models used by that look-up table 22 can be either acoustic finite element or boundary element models, such models varying the amplitude and phases of the output of individual transducer elements 12 in the array.

The features and advantages of the invention are numerous. The closed-spaced elements, having smaller form and size, allow improved handling during deployment and retrieval of the array, reduce the drag of the towed array, reduce the snap loads during towing, and reduce the weight or negative lift required to maintain the array depth. All of these features reduce flow noise and allow improved array performance. At the same time, cavitation caused by interaction between closely spaced elements is eliminated by filling the water space between elements with a rho-c rubber.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A cavitation-resistant sonar array for attachment to a variable depth sonar body comprising:

a transducer mount;

a plurality of transducer elements having exposed edges and arranged to form an array, such array attached to said transducer mount;

a layer of a rho-c material having the rho-c value as that of seawater and bonded to adjacent edges of said transducer elements and filling the spaces between adjacent transducer edges, said rho-c material surrounding the adjacent transducers of said plurality of transducers; and a processing unit connected to said transducer elements correcting speed of sound differences in said rho-c material compared to speed of sound in seawater.

2. A cavitation-resistant sonar array for attachment to a variable depth sonar body as in claim 1 wherein said plurality of transducer elements form an array having a spacing between elements less than one-quarter wavelength of an emitted signal.

3. A cavitation-resistant sonar array for attachment to a variable depth sonar body as in claim 1 wherein said layer of rho-c material is a rho-c rubber material.

4. A cavitation-resistant sonar array for attachment to a variable depth sonar body as in claim 1 wherein said processing unit includes a look-up table incorporating an acoustic finite element model.

5. A cavitation-resistant sonar array for attachment to a variable depth sonar body as in claim 1 wherein said processing unit comprises a look-up table incorporating a boundary element model.

6. A cavitation-resistant sonar array for attachment to a variable depth sonar body as in claim 4 wherein said acoustic finite element model provides amplitude and phase corrections of individual elements with the array.

7. A cavitation-resistant sonar array for attachment to a variable depth sonar body as in claim 5 wherein said boundary element model provides amplitude and phase corrections of individual elements with the array.

8. A cavitation-resistant sonar array for attachment to a variable depth sonar body comprising:

a transducer mount;

a plurality of transducer elements having exposed edges and arranged to form an array, such array attached to said transducer mount; and means for suppressing cavitation attached to said plurality of transducer elements.

9. A cavitation-resistant sonar array for attachment to variable depth sonar body as in claim 8 wherein said means for suppressing cavitation comprises a rho-c material bonded to adjacent edges of said transducer elements.

10. A cavitation-resistant sonar array for attachment to variable depth sonar body as in claim 9 wherein said rho-c material is rho-c rubber.

11. A cavitation-resistant sonar array for attachment to variable depth sonar body as in claim 8 wherein said means for suppressing cavitation comprises a processing unit.

12. A cavitation-resistant sonar array for attachment to variable depth sonar body as in claim 11 wherein said processing unit includes a look-up table incorporating an acoustic finite element model.

13. A cavitation-resistant sonar array for attachment to variable depth sonar body as in claim 11 wherein said processing unit includes a look-up table incorporating a boundary element model.

14. A cavitation-resistant sonar array for attachment to a variable depth sonar body as in claim 12 wherein said acoustic finite element model provides amplitude and phase corrections of individual elements with the array.

15. A cavitation-resistant sonar array for attachment to a variable depth sonar body as in claim 13 wherein said boundary element model provides amplitude and phase corrections of individual elements with the array.

* * * * *